United States Patent [19]

Cooley et al.

[11] 4,295,910

[45] Oct. 20, 1981

[54] PROCESS FOR PRODUCTION OF VINYL FILM-CELLULOSIC LAMINATES AND LAMINATES PRODUCED THEREBY

[75] Inventors: James Cooley; Ozzie Fogle, both of Orangeburg, S.C.

[73] Assignee: Champion International Corporation, Stamford, Conn.

[21] Appl. No.: 143,625

[22] Filed: Apr. 25, 1980

[51] Int. Cl.³ .................................................. C09J 5/04
[52] U.S. Cl. ..................................... 156/314; 156/90; 156/307.5; 156/315; 156/320; 156/334; 427/303; 427/408; 428/424.4; 428/425.1; 428/514; 428/520
[58] Field of Search ................... 156/307.5, 314, 320, 156/315, 332, 334, 90; 428/424.4, 425.1, 420, 520, 514; 427/302, 408, 303, 333, 340

[56] References Cited

U.S. PATENT DOCUMENTS

| | | | |
|---|---|---|---|
| 2,384,269 | 9/1945 | Bake | 156/315 |
| 2,430,479 | 11/1947 | Pratt et al. | 428/425.1 |
| 2,728,703 | 12/1955 | Kiernan et al. | 156/320 |
| 2,804,400 | 8/1957 | Kelly et al. | 427/408 |
| 3,661,696 | 5/1972 | Knutson | 428/520 |
| 3,725,124 | 4/1973 | Gorton | 156/332 |
| 4,152,313 | 5/1979 | Fogle et al. | 428/514 |

*Primary Examiner*—John J. Gallagher
*Attorney, Agent, or Firm*—Evelyn M. Sommer

[57] ABSTRACT

A lamination process is provided for the lamination of a vinyl film to a cellulosic substrate, such as a wood product, e.g., particleboard, wherein grain swelling of the substrate is avoided. The process involves coating the wood product substrate with an organic polyisocyanate having at least two active isocyanate groups per molecule as a primer coat, and thereafter applying a vinyl acetate-ethylene copolymer emulsion adhesive to the primed substrate to form an interlaminate adhesive layer. A vinyl polymeric film is then applied to the adhesive-coated substrate to form a permanently bonded laminate of the substrate and the film. The lamination process of the present invention is particularly suitable for use in a continuous hot-line heat reactivated laminating procedure.

9 Claims, No Drawings

PROCESS FOR PRODUCTION OF VINYL FILM-CELLULOSIC LAMINATES AND LAMINATES PRODUCED THEREBY

BACKGROUND OF THE INVENTION

1. Field of the Invention

This invention relates to a process for the lamination of a vinyl film to a cellulosic substrate and to laminated products produced thereby. More particularly, this invention relates to a process for the formation of a vinyl film-cellulosic substrate laminate wherein a novel multi-layer lamination adhesive process is utilized.

2. Prior Art

Numerous adhesives have been proposed for use in laminating vinyl films to cellulosic substrates. However, various shortcomings exist with many such adhesives. Thus, proteinaceous materials while being relatively inexpensive and characterized by good adhesive properties are highly susceptible to water. Organic solutions of polyacrylates are flamable, toxic and cause product swelling or solvation of the vinyl plastic.

Vinyl acetate-ethylene emulsion adhesives have been proposed for use in connection with vinyl surfaces. The use of such emulsion adhesives is particularly attractive since emulsion adhesives provide an at least partially water-born system thereby minimizing the use of volatile organic solvents which provide environmental hazards. However, the vinyl acetate-ethylene emulsion adhesives have often suffered from inadequate bond performance when used to produce vinyl film-cellulosic substrate laminates and particularly in connection with those laminates formed in a continuous hot-line heat reactivated laminating process.

U.S. Pat. No. 4,152,313 to O. Fogle, J. Cooley and M. E. Taylor describes a vinyl acetate-ethylene emulsion adhesive comprising toluene and an N-lower alkyl substituted pyrrolidone. Such adhesive provides improved bond strength and has been found suitable for use in continuous hot-line heat reactivated laminating processes.

However, the use of aqueous-based emulsion adhesives on cellulosic substrates can cause a rise or swelling of the surface of the cellulosic substrate. Accordingly, it would be highly desirable to provide a polymeric emulsion adhesive system which avoids such swelling and which increases strength of the adhesive.

SUMMARY OF THE INVENTION

According to the present invention a lamination process is provided for the lamination of a vinyl film to a cellulosic substrate, such as a wood product, e.g., particleboard, wherein grain swelling of the substrate is avoided. The process of the present invention involves coating the wood product substrate with an organic polyisocyanate which has at least two active isocyanate groups per molecule, as a primer coat, and thereafter applying an vinyl acetate-ethylene copolymer emulsion adhesive to the primed substrate to form an interlaminate adhesive layer. A vinyl polymeric film is then applied to the adhesive-coated substrate to form a permanently bonded laminate of the substrate and the film.

The laminate produced by the process of the present invention is not distorted due to grain swelling of the substrate, despite the use of an aqueous emulsion adhesive. The lamination process of the present invention is particularly suitable for use in a continuous hot-line heat reactivated laminating procedure.

DETAILED DESCRIPTION OF THE INVENTION

The lamination process of the present invention provides a method for the formation of a permanent bond between a vinyl film and a cellulosic substrate. The cellulosic substrates utilized in the present invention include combination boards such as particle board, chipboard and the like; lauan; plywood; hardboard, etc. It is preferred that the cellulosic substrate be a wood product substrate, such as those disclosed above.

The wood product substrate is coated with an organic polyisocyanate having at least two active isocyanate groups per molecule. Any organic polyisocyanate compound having at least two active isocyanates per molecule may be utilized. Such compounds include diphenylmethane diisocyanates, alkylene diisocyanates, phenylene and halogenated phenylene diisocyanates, toluene di- and triisocyanates, triphenylmethane triisocyanates, and polyalkylene polyphenylisocyanates as well as the polyisocyanate manufactured by Goodyear and bearing product Nos. 4295 and 4002.

A preferred class of polyisocyanates for use in the present invention are the polyaromatic polyisocyanates where the isocyanate groups, i.e., $-N=C=O$, are on different aromatic rings. An especially preferred polyisocyanate for use in the present invention comprises polymethylene polyphenylisocyanate mixtures having an average of about three isocyanate groups per molecule (commercially available from the Upjohn Company, Polymer Chemicals Division, under the trademark PAPI).

Application of the organic polyisocyanate preferably involves the use of a solvent, such as those conventionally used to dilute or lower the viscosity of organic polyisocyanates. Such solvents include lower alkyl ketones such as methyl ethyl ketone and acetone; hydrocarbon distillates; disubstituted amides, such as N,N-dimethyl acetamede; and chlorinated solvents. The preferred solvent system for the polyisocyanate of the present invention comprises a mixture of toluene and an N-lower alkyl substituted pyrrolidone. By the term "lower alkyl" is menat 1 to 4 carbon atoms and the preferred alkyl moiety is methyl.

The mixture of toluene and N-Lower alkyl pyrrolidone is used in a minor proportion, i.e., less than 50 percent by weight, based on the total weight of the polyisocyanate and the solvent system. Preferably, such solvent system is used in an amount of about 25 percent to about 40 percent, most preferably about 33 percent by weight, based on the total weight of the polyisocyanate and the solvent.

The mixture of N-lower alkyl pyrrolidone and toluene comprises toluene in a major amount and a N-lower alkyl pyrrolidone in a minor amount, preferably in a weight ratio of toluene to N-lower alkyl pyrrolidone of between about 9 to 1 and about 3 to 1, most preferably, about 6 to 1.

Application of the polyisocyanate composition to the wood product substrate is carried out by any conventional means such as spraying, doctoring, rolling, brushing and the like. Generally, the polyisocyanate is applied so as to give a coverage of no less than about 0.5 grams of polyisocyanate per square foot of substrate, preferably in an amount of about 1 gram of polyisocyanate per square foot of substrate. Thus, when the polyisocyanate is applied in combination with a solvent system with the solvent system being used in the preferred amount of 33 percent by weight, based on the combined weight of the solvent and the polyisocyanate, the polyisocyanate and solvent system combination is preferably applied in an amount of 1.5 grams per square foot.

If a volatile solvent system has been utilized, it is desirable to allow evaporation of the volatile solvent prior to the application of the emulsion adhesive to the polyisocyanate coat.

Following application of the primer coat, a vinyl acetate-ethylene copolymer emulsion adhesive is applied to the primer coat to form an adhesive interlaminate layer. The vinyl acetate-ethylene emulsion adhesives are known materials and are generally aqueous emulsions of such copolymer in which the vinyl acetate constitutes the major copolymerized monomer. The copolymer usually contains about 75 to about 90 percent, by weight, of vinyl acetate and can also contain small amounts of other copolymerized materials such as an acrylic acid or a sulfonic comonomer. Such emulsion adhesives are described in U.S. Pat. No. 4,152,313 to O. Fogle, J. Cooley and M. E. Taylor which is hereby incorporated by reference.

The emulsion adhesive can also contain minor amounts of protective colloids such as casein, various natural gums, polyvinyl alcohol, and the like, emulsifying agents, plasticizers such as phthalate esters, glycol derivatives, esters of adipic sebacic, abietic and ricinoleic acids, toluene sulfonic acid derivatives, and the like, fillers and pigments.

The solids content of the emulsion adhesive is adjusted so that the resulting viscosity is appropriate for ease of coating and the solids content is usually between about 25 and about 75 percent, preferably, between about 35 to about 65 percent, by weight.

The vinyl acetate-ethylene adhesive preferably additionally contains between about 5 percent and about 15 percent, by weight, most preferably about 10 percent by weight of an N-lower alkyl pyrrolidone, preferably, N-methylpyrrolidone. 2-pyrrolidone on N-vinyl-2-pyrrolidone can be used to equal advantage in place of the N-methylpyrrolidone.

The emulsion adhesive is applied to the polyisocyanate layer by any conventional technique, such as spraying, doctoring, rolling, brushing and the like, to provide a wet thickness of about 1 to 8 mils and preferably about 2 to 3 mils or a coverage of about 3 grams per sauare foot, to about 10 grams per square foot, preferably about 7.5 grams per square foot.

According to a preferred embodiment of the invention, the vinyl acetate-ethylene emulsion adhesive is applied in two or more sequential applications wherein each such coating is dried prior to application of the subsequent coating.

Thereafter, a vinyl film is applied to the thus formed interlaminate adhesive layer so as to form a permanent bond between the substrate and the film. Application of the vinyl film is generally carried out under conditions of elevated temperatures and pressure. The lamination temperature can be between about 200° F. (93° C.) and about 300° F. (149° C.), preferably, between about 240° F. (116° C.) to about 260° F. (127° C.), most preferably at about 250° F. (121° C.). Lamination pressures can be between about 8 and about 40 Kg/Lcm, preferably, between about 12 and about 25 Kg/Lcm.

Vinyl films which can be utilized in the present invention include cast, calendered and extruded vinyl films. Suitable vinyl films include polyvinyl chloride, copolymers of vinyl chloride, such as vinyl chloride-vinyl acetate copolymers, polyvinyl fluoride, polyvinyl formal, polyvinylidene chloride, polyvinyl butyral, polyvinylidene fluoride, and the like. The preferred vinyl film for use in the present invention is a polyvinyl chloride film. Vinyl films of any thickness may be used in the present invention, however, preferred are those having a thickness of between 1 and about 6 mils, most preferably, about 2 mils.

In an especially preferred embodiment, the laminate is formed in a continuous hot-line heat reactivated laminating process. In such a process, the cellulosic substrate is continuously conveyed through several zones of coating and heating. In the first zone, the organic polyisocyanate is applied to form a primer coat. Volatile solvent present in the primer is allowed to evaporate. Next, the coated substrate is passed to the second zone wherein about one-half of the total desired amount of the copolymer emulsion adhesive is roller coated directly onto the primer coating. The thus coated substrate is passed to a third zone wherein it is subjected to an elevated temperature of between about 100° F. (38° C.) and about 300° F. (149° C.) so as to substantially dry but not cure the first adhesive coat. Heating may be carried out by means of infrared radiation or high velocity hot air. A further portion of the copolymer emulsion is then coated onto the first adhesive coat in a fourth zone and the coated substrate is passed to a fifth zone for drying as in the third zone, to thereby form the adhesive interlaminate layer.

The substrate bearing the adhesive interlaminate layer is thereafter reheated to a surface temperature of about 180° F. (82° C.) to about 250° F. (121° C.) immediately prior to the application of the vinyl film to reactivate the adhesive. The vinyl film is applied and the composite passed through rollers at an elevated temperature of about 225° F. (107° C.) to about 275° F. (135° C.), preferably, about 250° F. (121° C.) to effect the lamination.

The following examples illustrate the process of the present invention and advantages thereof.

EXAMPLE 1

A 2 mil polyvinyl chloride film is to be laminated to a particle board substrate. An organic polyisocyanate primer is prepared by mixing 70 grams of, an approximately trifunctional polymethylene polyphenylisocyanate mixture (commercially available from The Upjohn Company, Polymer Chemicals Division under the trademark PAPI) with 30 grams of toluene and 5 grams of N-methylpyrrolidone. A vinyl acetate-ethylene emulsion adhesive is prepared by mixing a commercially available vinyl acetate-ethylene emulsion adhesive (Elvace 1875 sold by DuPont) with 10 grams of N-methylpyrrolidone.

The particle board substrate is continuously conveyed through a multi-zone coating and laminating line. In the first zone, the polyisocyanate primer composition is direct roller coated onto the particle board substrate to provide a coverage of 1.5 grams per square foot. Following evaporation of the toluene solvent, the coated particle board is passed to a second zone wherein the emulsion adhesive is direct roller coated onto the polyisocyanate layer to provide a coverage of 3.75 grams of emulsion adhesive per square foot. The third zone is a 30 foot long oven maintained at a temperature of between about 100° F. (38° C.) and about 350° F. (177° C.) and the coated particle board is conveyed therethrough at a speed of about 120 feet per minute to dry the first adhesive coat.

In the fourth zone, an additional coating of the emulsion adhesive is applied to provide a coverage of about 3.75 grams per square foot and the thus coated particle board is passed through a fifth zone which is a 40 foot long oven maintained at a temperature of between about 100° F. (38° C.) and about 350° F. (177° C.) at the same speed as passage through the third zone.

In the sixth zone, the substrate with the dried adhesive coating is heated to a surface temperature of about 250° F. (121° C.) in order to reactivate the adhesive. A 2 mil thick polyvinyl chloride film is applied and the resulting composite is then passed under a rubber roll maintained at 250° F. (121° C.) to thereby form a permanent bond between the vinyl film and the particle board substrate.

The laminate has a smooth surface free from distortion. Attempts to remove the vinyl film result in breaking of the vinyl film.

EXAMPLE 2

In order to demonstrate the importance of utilizing the polyisocyanate as a primer for initially contacting the wood product in a sequential operation, rather than in admixture with the copolymer, the process of Example 1 is repeated; however, a vinyl acetate-ethylene emulsion (30 percent by weight) is added to polymethylene polyphenylisocyanate (60 percent by weight) and N-methylpyrrolidone (10 percent by weight) for use as the first coating.

Thereafter, the application of the second and third coatings is in the same manner with the same materials, amounts and conditions as in Example 1.

A permanently bonded vinyl film/particle board laminate results. However, the polyisocyanate, vinyl acetate-ethylene emulsion adhesive mixture is very reactive and difcifult to handle rendering it unsuitable for use in continuous lamination processes.

Although the invention has been described in considerable detail with particular reference to certain preferred embodiments thereof, variations and modifications can be effected within the spirit and scope of the invention as described hereinbefore, and as defined in the appended claims.

What is claimed is:

1. A process for bonding a polymeric film to a cellulosic substrate which comprises:
    (A) coating said substrate with an organic polyisocyanate having at least two active isocyanate groups per molecule;
    (B) coating vinyl acetate-ethylene copolymer emulsion adhesive onto said polyisocyanate to form an interlaminate adhesive layer; and
    (C) applying a vinyl polymeric film to said interlaminate adhesive layer; whereby a permanently bonded laminate is formed.

2. The process of claim 1, wherein said interlaminate adhesive layer is formed by at least two sequentially applied coatings of said vinyl acetate-ethylene copolymer emulsion adhesive.

3. The process of claim 2, wherein the first coating of said vinyl acetate-ethylene copolymer emulsion adhesive is dried prior to the application of the second coating of said vinyl acetate-ethylene copolymer emulsion adhesive.

4. The process of claim 3, wherein the second coating of said vinyl acetate-ethylene copolymer emulsion adhesive is dried prior to the application of said vinyl polymeric film and wherein said interlaminate adhesive layer is heated prior to the application of said vinyl polymeric film.

5. The process of claim 4, wherein said intermediate adhesive layer is heated at a temperature in the range of between about 180° and about 250° F. prior to the application of said vinyl polymeric film.

6. The process of claim 1, wherein said polyisocyanate is a polymethylene polyphenylisocyanate.

7. The process of claim 6, wherein said polymethylene polyphenylisocyanate is dissolved in a mixture of toluene and N-alkyl pyrrolidone.

8. The process of claim 1, wherein said vinyl polymeric film is applied to said interlaminate adhesive layer at a temperature in the range of between about 200° and 300° F.

9. The process of claim 7, wherein said interlaminate adhesive layer is heated at a temperature in the range of between about 240° and 260° F.

* * * * *